(12) United States Patent
Van Zanten et al.

(10) Patent No.: US 8,881,820 B2
(45) Date of Patent: Nov. 11, 2014

(54) TREATMENT FLUIDS COMPRISING ENTANGLED EQUILIBRIUM POLYMER NETWORKS

(75) Inventors: Ryan Van Zanten, Spring, TX (US); Ryan G. Ezell, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/771,119

(22) Filed: Apr. 30, 2010

(65) Prior Publication Data

US 2011/0048718 A1     Mar. 3, 2011

Related U.S. Application Data

(63) Continuation-in-part of application No. 12/551,334, filed on Aug. 31, 2009.

(51) Int. Cl.
| | |
|---|---|
| *E21B 43/26* | (2006.01) |
| *C09K 8/508* | (2006.01) |
| *C09K 8/12* | (2006.01) |
| *C09K 8/68* | (2006.01) |
| *C09K 8/76* | (2006.01) |
| *C09K 8/88* | (2006.01) |

(52) U.S. Cl.
CPC . *C09K 8/508* (2013.01); *C09K 8/12* (2013.01); *C09K 8/68* (2013.01); *C09K 8/76* (2013.01); *C09K 8/88* (2013.01); *C09K 2208/30* (2013.01)
USPC ..................................... 166/305.1; 166/308.1

(58) Field of Classification Search
USPC .......................................... 175/64; 166/305.1
See application file for complete search history.

(56) References Cited

U.S. PATENT DOCUMENTS

| | | | |
|---|---|---|---|
| 2,779,418 A | | 1/1957 | Garst |
| 2,935,129 A | | 5/1960 | Allen et al. |
| 4,695,389 A | | 9/1987 | Kubala |
| 4,725,372 A | | 2/1988 | Teot et al. |
| 5,030,366 A | | 7/1991 | Wilson et al. |
| 5,309,999 A | * | 5/1994 | Cowan et al. .................. 166/293 |

(Continued)

FOREIGN PATENT DOCUMENTS

| | | |
|---|---|---|
| CA | 2575501 A1 | 6/2006 |
| CA | 2669627 A1 | 6/2008 |

(Continued)

OTHER PUBLICATIONS

Halliburton Brochure entitled BioVert™ H150 Diverter and Fluid Loss Control Material; 2008.

(Continued)

*Primary Examiner* — Zakiya W Bates
*Assistant Examiner* — Silvana Runyan
(74) *Attorney, Agent, or Firm* — McDermott Will & Emery LLP; Holly Soehnge

(57) ABSTRACT

Compositions and methods relating to treatment fluids that comprise entangled equilibrium polymer networks in subterranean applications. Such methods include providing a treatment fluid comprising at least one entangled equilibrium polymer network, and placing the treatment fluid in a subterranean formation. Other methods include providing a treatment fluid having a first viscosity comprising an aqueous base fluid and at least one entangled equilibrium polymer network; placing the treatment fluid in a subterranean formation; contacting the treatment fluid with a hydrocarbon; and allowing the viscosity of the treatment fluid to decrease to a second viscosity that is lower than the first viscosity.

18 Claims, 6 Drawing Sheets

(56) References Cited

U.S. PATENT DOCUMENTS

| | | | |
|---|---|---|---|
| 5,314,022 A | 5/1994 | Cowan et al. | |
| 5,361,842 A * | 11/1994 | Hale et al. | 166/293 |
| 5,373,901 A | 12/1994 | Norman et al. | |
| 5,515,921 A * | 5/1996 | Cowan et al. | 166/293 |
| 5,551,516 A | 9/1996 | Norman et al. | |
| 5,663,123 A | 9/1997 | Goodhue, Jr. et al. | |
| 5,684,075 A | 11/1997 | Patel et al. | |
| 5,804,535 A | 9/1998 | Dobson et al. | |
| 5,879,699 A | 3/1999 | Lerner | |
| 5,979,555 A | 11/1999 | Gadberry et al. | |
| 5,996,692 A | 12/1999 | Chan et al. | |
| 6,063,737 A | 5/2000 | Haberman et al. | |
| 6,063,738 A | 5/2000 | Chatterji et al. | |
| 6,239,183 B1 | 5/2001 | Farmer et al. | |
| 6,283,213 B1 | 9/2001 | Chan | |
| 6,435,277 B1 | 8/2002 | Qu et al. | |
| 6,444,316 B1 | 9/2002 | Reddy et al. | |
| 6,506,710 B1 | 1/2003 | Hoey et al. | |
| 6,527,051 B1 | 3/2003 | Reddy et al. | |
| 6,547,871 B2 | 4/2003 | Chatterji et al. | |
| 6,554,071 B1 | 4/2003 | Crook et al. | |
| 6,831,043 B2 | 12/2004 | Patel et al. | |
| 6,881,709 B2 | 4/2005 | Nelson et al. | |
| 6,908,888 B2 | 6/2005 | Lee et al. | |
| 7,060,661 B2 | 6/2006 | Dobson, Sr. et al. | |
| 7,081,439 B2 | 7/2006 | Sullivan et al. | |
| 7,084,095 B2 | 8/2006 | Lee et al. | |
| 7,159,659 B2 | 1/2007 | Welton et al. | |
| 7,238,648 B2 | 7/2007 | Dahayanake et al. | |
| 7,279,446 B2 | 10/2007 | Colaco et al. | |
| 7,293,609 B2 | 11/2007 | Dealy et al. | |
| 7,299,874 B2 | 11/2007 | Welton et al. | |
| 7,303,019 B2 | 12/2007 | Welton et al. | |
| 7,320,952 B2 | 1/2008 | Chen et al. | |
| 7,341,980 B2 | 3/2008 | Lee et al. | |
| 7,351,681 B2 | 4/2008 | Reddy et al. | |
| 7,387,987 B2 | 6/2008 | Chen et al. | |
| 7,527,103 B2 | 5/2009 | Huang et al. | |
| 7,547,663 B2 * | 6/2009 | Kirsner et al. | 507/103 |
| 7,858,561 B2 | 12/2010 | Abad et al. | |
| 7,985,718 B2 | 7/2011 | Steinbrenner et al. | |
| 8,053,396 B2 | 11/2011 | Huff et al. | |
| 8,148,303 B2 | 4/2012 | Van Zanten et al. | |
| 8,618,026 B2 | 12/2013 | Ezell et al. | |
| 2002/0193257 A1 | 12/2002 | Lee et al. | |
| 2003/0054962 A1 | 3/2003 | England et al. | |
| 2003/0134751 A1 | 7/2003 | Lee et al. | |
| 2004/0043905 A1 | 3/2004 | Miller et al. | |
| 2004/0211558 A1 | 10/2004 | Morales et al. | |
| 2005/0107265 A1 | 5/2005 | Sullivan et al. | |
| 2005/0107503 A1 | 5/2005 | Couillet et al. | |
| 2005/0119401 A1 | 6/2005 | Bavouzet et al. | |
| 2005/0194145 A1 | 9/2005 | Beckman et al. | |
| 2005/0252659 A1 | 11/2005 | Sullivan et al. | |
| 2006/0046937 A1 | 3/2006 | Fu et al. | |
| 2006/0081372 A1 | 4/2006 | Dealy et al. | |
| 2006/0128597 A1 | 6/2006 | Chen et al. | |
| 2006/0183646 A1 | 8/2006 | Welton et al. | |
| 2006/0258541 A1 | 11/2006 | Crews | |
| 2007/0012445 A1 | 1/2007 | Nguyen et al. | |
| 2007/0066491 A1 | 3/2007 | Bicerano et al. | |
| 2007/0114022 A1 | 5/2007 | Nguyen | |
| 2007/0123431 A1 | 5/2007 | Jones et al. | |
| 2007/0215355 A1 | 9/2007 | Shapovalov et al. | |
| 2007/0281869 A1 * | 12/2007 | Drochon et al. | 507/219 |
| 2007/0284103 A1 | 12/2007 | Dealy et al. | |
| 2008/0110618 A1 | 5/2008 | Quintero et al. | |
| 2008/0119374 A1 | 5/2008 | Willberg et al. | |
| 2008/0121395 A1 | 5/2008 | Reddy et al. | |
| 2008/0194435 A1 | 8/2008 | Huff et al. | |
| 2008/0236823 A1 | 10/2008 | Willberg et al. | |
| 2009/0008091 A1 | 1/2009 | Quintero et al. | |
| 2009/0111716 A1 | 4/2009 | Hough et al. | |
| 2009/0209438 A1 | 8/2009 | Thieme et al. | |
| 2009/0270280 A1 * | 10/2009 | Zhang et al. | 507/211 |
| 2010/0031418 A1 | 2/2010 | Op't Hof | |
| 2010/0056405 A1 | 3/2010 | Ali et al. | |
| 2010/0081586 A1 | 4/2010 | Smith et al. | |
| 2010/0081587 A1 | 4/2010 | van Zanten et al. | |
| 2010/0256025 A1 | 10/2010 | van Zanten et al. | |
| 2010/0263863 A1 | 10/2010 | Quintero et al. | |
| 2010/0300759 A1 | 12/2010 | Passade-Boupat et al. | |
| 2011/0005773 A1 | 1/2011 | Dusterhoft et al. | |
| 2011/0048716 A1 | 3/2011 | Ezell | |
| 2011/0053812 A1 | 3/2011 | Ezell et al. | |
| 2011/0071056 A1 | 3/2011 | Saini et al. | |

FOREIGN PATENT DOCUMENTS

| | | |
|---|---|---|
| CA | 2721973 A1 | 10/2009 |
| CN | 1809622 A | 7/2006 |
| CN | 1882672 A | 12/2006 |
| CN | 101238193 A | 8/2008 |
| EP | 0 037 699 A2 | 10/1981 |
| EP | 2 085 448 A1 | 8/2009 |
| GB | 2 383 355 A | 6/2003 |
| GB | 2457151 A | 8/2009 |
| WO | WO 02/070862 A1 | 9/2002 |
| WO | WO02070862 A1 | 9/2002 |
| WO | 03056130 A1 | 7/2003 |
| WO | 2007031722 A1 | 3/2007 |
| WO | WO 2009/006251 A1 | 1/2009 |
| WO | WO 2009/030868 A2 | 3/2009 |
| WO | WO2011/023966 A1 | 3/2011 |
| WO | WO 2012/001361 A1 | 1/2012 |
| WO | WO 2012038704 A1 | 3/2012 |

OTHER PUBLICATIONS

Herzhaft; How to Unify Low-Shear-Rate Rheology and Gel Properties of Drilling Muds; A Transient Rheological and Structural Model for Complex Well Applications; IADC/SPE Drilling Conference, Miami, Florida, 2006; IADC/SPE 99080.

Burrows; Benchmark Performance: Zero Barite Sag and Significantly Reduced Downhole Losses with the Industry's First Clay-Free Synthetic-Based Fluid; IADC/SPE Drilling Conference; Dallas, Texas; 2004; IADC/SPE 87138.

Van Oort; New Flat-Rheology Synthetic-Based Mud for Improved Deepwater Drilling; Society of Petroleum Engineers; Houston, TX; 2004; SPE 90987.

Office Action for U.S. Appl. No. 12/551,334 dated Jul. 21, 2011.

Schlumberger, ClearFRAC LT Surfactant Article, Apr. 2005.

Crews et al., New Technology Improves Performance of Viscoelastic Surfactant Fluids, SPE-Drilling & Completion, 23, 41-47, 2008.

Samuel et al., Polymer-Free Fluid for Hydraulic Fracturing, SPE 38622, 1997.

Samuel, et al., A New Solids-Free Non-Damaging High Temperature Lost-Circulation Pill: Development and First Field Applications, SPE 81494, 2003.

Massiera et al., Hairy Wormlike Micelles: Structure and Interactions, Langmuir, 18, 5867-5694, 2002.

Massiera et al., The Steric Polymer Layer of Hairy Wormlike Michelles, Journal of Physics: Condensed Matter, 15, S225-S231, 2003.

Ramos et al., Structure of a New Type of Transient Network: Entangled Wormlike Micelles Bridged by Telechelic Polymers, Macromolecules, 40, 1248-1251, 2007.

Van Zanten, Dissertation, University of California Santa Barbara, pp. 74-143, 2007.

Ingram et al., Enhancing and Sustaining Well Production: Granite Wash, Texas Panhandle, SPE 106531, 2007.

Hellweg, Phase Structures of Microemulsions, Current Opinion in Colloid and Interface, Science 7, 50-56, 2003.

Kunieda et al., Effect of Added Salt on the Maximum Solubilization in an Ionic-Surfactant Microemulsion, Langmuir, 12, 5796-5799, 1996.

Gotch, et al., Formation of Single-Phase Microemulsions in Toluene/Water/Nonionic Surfactant Systems, Langmuir, 24, 4485-4493, 2008.

(56) References Cited

OTHER PUBLICATIONS

Welton, et al., Anionic Surfactant Gel Treatment Fluid, Society of Petroleum Engineers, SPE 105815, 2007.

International Search Report and Written Opinion for PCT/GB2010/001630 dated Oct. 19, 2010.

International Search Report and Written Opinion for PCT/GB2010/001631 dated Oct. 19, 2010.

Aleman et al.; Definitions of Terms Relating to the Structure and Processing of Sols, Gels, Networks, and Inorganic-Organic Hybrid Materials; IUPAC Recommandations 2007, Pure Appl. Chem., vol. 79, No. 10, pp. 1801-1829; XP-002603495.

International Search Report and Written Opinion for PCT/GB2010/001629 dated Oct. 22, 2010.

Penny et al., "The Application of Microemulsion Additives in Drilling and Stimulation Results in Enhanced Gas Production," 2005 SPE Production and Operations Symposium held in Oklahoma City, OK, SPE 94274.

International Search Report and Written Opinion for PCT/GB2011/001136 dated Sep. 29, 2011.

International Search Report and Written Opinion for PCT/GB2011/000988 dated Oct. 12, 2011.

International Search Report and Written Opinion for PCT/GB2011/001386 dated Dec. 2, 2011.

International Search Report and Written Opinion for PCT/GB2012/000411 dated Jul. 19, 2012.

International Preliminary Report on Patentability for PCT/GB2010/0001629 dated Mar. 15, 2012.

Official Action for Canadian Patent Application No. 2,772,108 dated Mar. 26, 2013.

Official Action for Canadian Patent Application No. 2,772,132 dated May 28, 2013.

Official Action for Chinese Patent Application No. 201080045742.6 dated Aug, 22, 2013.

Official Action for Chinese Patent Application CN 201080045743.0 dated Jan. 22, 2014.

Official Action for EA Patent Application No. 201270354 dated Dec. 12, 2013.

* cited by examiner

TREATMENT FLUIDS COMPRISING ENTANGLED EQUILIBRIUM POLYMER NETWORKS

CROSS REFERENCE TO RELATED APPLICATIONS

This application is a continuation-in-part application of U.S. patent application Ser. No. 12/551,334, entitled "Treatment Fluids Comprising Transient Polymer Networks," filed on Aug. 31, 2009 and published as U.S. 2011/0048716, the entirety of which is herein incorporated by reference, and from which priority is claimed pursuant to 35 U.S.C. §120.

BACKGROUND

The present invention relates to methods for treating subterranean formations. More particularly, in certain embodiments, the present invention relates to methods of using in subterranean applications treatment fluids that comprise at least one entangled equilibrium polymer network.

In today's downhole technology, a large portion of the wells have been completed at depths of greater than 15,000 ft, and as a result, most previously designed treatment fluids and additives that were designed for more shallow wells may not perform adequately at temperatures and at pressures commonly associated with wells of greater depths. Wells at depths exceeding 15,000 ft often involve higher temperatures and pressures, necessitating the need for fluids and additives that will perform at these depths. In addition to the high temperatures and pressures, wells completed at these depths often produce fluids like carbon dioxide ($CO_2$) or hydrogen sulfide ($H_2S$).

Viscosified treatment fluids may be used in a variety of subterranean treatments. As used herein, the term "treatment," or "treating," refers to any subterranean operation that uses a fluid in conjunction with a desired function and/or for a desired purpose. The term "treatment," or "treating," does not imply any particular action by the fluid. Examples of common subterranean treatments include, but are not limited to, drilling operations, pre-pad treatments, fracturing operations, perforation operations, pre-flush treatments, after-flush treatments, sand control treatments (e.g., gravel packing), acidizing treatments (e.g., matrix acidizing or fracture acidizing), diverting treatments, cementing treatments, and well bore clean-out treatments. For example, in certain fracturing treatments generally a treatment fluid (e.g., a fracturing fluid or a "pad fluid") is introduced into a well bore that penetrates a subterranean formation at a sufficient hydraulic pressure to create or enhance one or more pathways, or "fractures," in the subterranean formation. These cracks generally increase the permeability of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore penetrating the formation.

Treatment fluids are also utilized in sand control treatments, such as gravel packing. In "gravel-packing" treatments, a treatment fluid suspends particulates (commonly referred to as "gravel particulates"), and at least a portion of those particulates are then deposited in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like. Once the gravel pack is substantially in place, the viscosity of the treatment fluid may be reduced to allow it to be recovered. In some situations, fracturing and gravel-packing treatments are combined into a single treatment (commonly referred to as "FRACPAC™" fracturing treatments). In such "FRAC-PAC™" fracturing treatments, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in treatment fluids may be important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport, as well as to create or enhance fracture width. Particulate transport is also important in sand control treatments, such as gravel packing. Maintaining sufficient viscosity may be important to control and/or reduce leak-off into the formation, improve the ability to divert another fluid in the formation, and/or reduce pumping requirements by reducing friction in the well bore. At the same time, while maintaining sufficient viscosity of a treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to cationic polymers, high molecular weight polyacrylamide polymers, polysaccharides, synthetic polymers, and the like. The use of pure polymeric gelling agents, however, may be problematic. For instance, these polymeric gelling agents may leave an undesirable gel residue in the subterranean formation after use, which can impact permeability. As a result, costly remedial operations may be required to clean up the fracture face and proppant pack. Foamed treatment fluids and emulsion-based treatment fluids have been employed to minimize residual damage, but increased expense and complexity often have resulted.

To combat perceived problems associated with polymeric gelling agents, some surfactants have been used as gelling agents. It is well understood that, when mixed with an aqueous fluid in a concentration above the critical micelle concentration, the molecules (or ions) of surfactants may associate to form micelles. Certain viscosifying micelles may impart increased viscosity to a fluid such that the fluid exhibits viscoelastic behavior (e.g., shear thinning properties) due, at least in part, to the association of the surfactant molecules contained therein.

However, the use of surfactants as gelling agents may be problematic in several respects. In certain applications, large quantities of viscoelastic surfactants may be required to impart the desired rheological properties to a fluid. Certain viscoelastic surfactants may be less soluble in certain fluids, which may impair the ability of those surfactants to form viscosifying micelles. Viscoelastic surfactant fluids also may be unstable at high temperatures and/or in high salt concentrations due to, among other things, the tendency of high salt concentrations to "screen out" electrostatic interactions between viscosifying micelles.

SUMMARY

The present invention relates to methods for treating subterranean formations. More particularly, in certain embodiments, the present invention relates to methods of using in subterranean applications treatment fluids that comprise at least one entangled equilibrium polymer network.

In one embodiment, the present invention provides a method comprising: providing a treatment fluid comprising an aqueous base fluid and at least one entangled equilibrium polymer network; and placing the treatment fluid in a subterranean formation.

In another embodiment, the present invention provides a method comprising: providing a treatment fluid having a first viscosity comprising an aqueous base fluid and at least one entangled equilibrium polymer network; placing the treatment fluid in a subterranean formation; contacting the treatment fluid with a hydrocarbon; and allowing the viscosity of the treatment fluid to decrease to a second viscosity that is lower than the first viscosity.

In yet another embodiment, the present invention provides a method comprising: providing a drilling fluid comprising an aqueous base fluid and at least one entangled equilibrium polymer network; and using the drilling fluid to drill at least a portion of a well bore in a subterranean formation.

The features and advantages of the present invention will be readily apparent to those skilled in the art upon a reading of the description of the embodiments that follows.

BRIEF DESCRIPTION OF THE DRAWINGS

These drawings illustrate certain aspects of some of the embodiments of the present invention, and should not be used to limit or define the invention.

Figure 1:
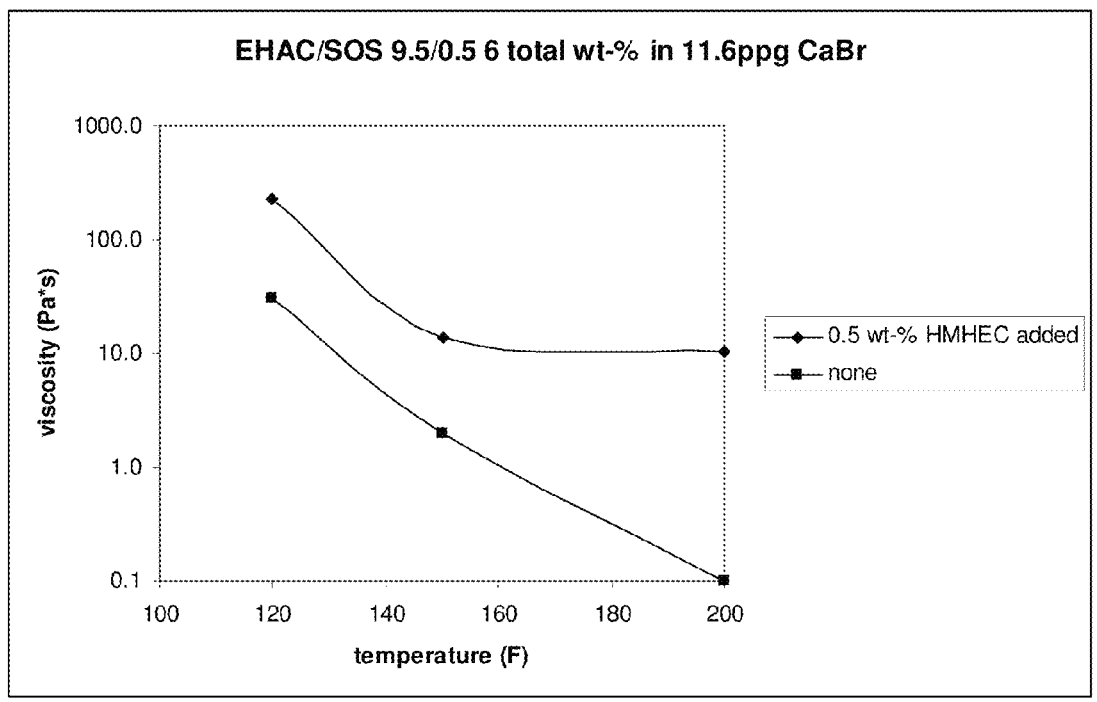
FIG. 1 is a graphical illustration of the viscosities in a treatment fluid comprising entangled equilibrium polymer networks versus a treatment fluid without the entangled equilibrium polymer networks.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

The present invention relates to methods for treating subterranean formations. More particularly, in certain embodiments, the present invention relates to methods of using in subterranean applications treatment fluids that comprise at least one entangled equilibrium polymer network.

In certain embodiments, the treatment fluids of the present invention may comprise entangled equilibrium polymer networks, which refer to inter- and intramolecularly associative systems (i.e., networks) of network forming polymer chains and worm-like micelles formed by the interactions of surfactant molecules, and that are capable of imparting elastic and suspension properties within a fluid. The term "entangled equilibrium polymer network(s)" refers to inter- and intramolecularly associative systems (i.e., networks) of network forming polymers and worm-like micelles that form associations via, e.g., physical crosslinks, Van der Waals forces, and/or electrostatic interactions, and impart elastic and suspension properties within a fluid. It is believed that, in such embodiments, the hydrophobic components of the network forming polymer(s) may become entangled with the worm-like micelles formed by the surfactant interactions. Among the many potential advantages of the present invention, the methods and compositions of the present invention may, among other things, enhance the viscoelasticity, stability, and/or other rheological properties of the treatment fluids, particularly at high temperatures and/or in brines or other high salinity conditions (greater than about 0.5 M). The methods of the present invention also may enhance the formation of entangled equilibrium polymer networks, which may enhance the viscoelasticity, stability, and/or other rheological properties of the resulting treatment fluid. The treatment fluids of the present invention retain the ability to lose viscosity when in contact with hydrocarbons. Moreover, the methods and compositions of the present invention may decrease damage to the formation caused by the use of pure polymeric viscosifying agents by facilitating the achievement of desired rheological properties in a fluid while utilizing lower concentrations of polymeric viscosifying agents.

For the purposes of describing the treatment fluids of the present invention and the entangled equilibrium polymer networks described herein, it is useful to describe certain rheological properties including yield point ("YP"), low-shear viscosity, plastic viscosity ("PV"), the equivalent circulating density ("ECD"), and yield stress (tau zero). The YP is defined as the value obtained from the Bingham-Plastic rheological model when extrapolated to a shear rate of zero. It may be calculated using 300 revolutions per minute ("rpm") and 600 rpm shear rate readings on a standard oilfield rheometer. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation may be performed by applying a least-squares fit or curve fit to the Herchel-Bulkley rheological model. A more convenient means of estimating the yield stress is by calculating the low-shear yield point ("LSYP") by the same formula shown below in Equation 2 though with the 6 rpm and 3 rpm readings substituted for the 600- and 300-rpm readings, respectively. PV represents the viscosity of a fluid when extrapolated to infinite shear rate. A low PV may indicate that a fluid is capable of drilling rapidly because, of among other things, the low viscosity of fluid exiting the drill bit and the ability to use an increased flow rate. A high PV may be caused by a viscous base fluid, excess colloidal solids, or both. The PV and YP are calculated by the following set of equations:

$$PV = (600 \text{ rpm reading}) - (300 \text{ rpm reading}) \quad \text{(Equation 1)}$$

$$YP = (300 \text{ rpm reading}) - PV \quad \text{(Equation 2)}$$

The ECD is the effective circulating density exerted by a fluid against the formation taking into account the flow rate and pressure drop in the annulus above the point being considered. A high PV may increase the ECD due to a greater pressure drop in the annulus caused by internal fluid friction. The treatment fluids of the present invention are thought to provide better ECD control.

These rheological properties may be measured using standard testing procedures and standard testing equipment known to those skilled in the art. For example, properties such as plastic viscosity expressed in centipoises, low-shear viscosity expressed in dial readings, yield point and LSYP expressed in lb/100 ft$^2$, and gel strength expressed in lb/100 ft$^2$ may be determined by the "ANSI/API RP 13B-2: Recommended Practice for Field Testing Oil-based Drilling Fluids," as of the time of filing, using a 115-volt motor-driven viscometer, such as a FANN® Model 35-A V-G Meter, which is incorporated herein by reference in its entirety. The rotational measurements represent standard rates at which readings may be taken. Actual rotational rates may vary slightly and may be corrected using correction factors, if necessary.

The treatment fluids of the present invention comprise at least one entangled equilibrium polymer network. In some embodiments, the entangled equilibrium polymer network may comprise residual monomer. The entangled equilibrium polymer networks are formed by the association of networking forming polymers and worm-like micelles formed by surfactant interactions within the aqueous fluid. Optionally, the treatment fluids of the present invention may comprise additional components.

The formation of such entangled equilibrium polymer networks in the treatment fluid may be determined by examining the viscosity of a treatment fluid at zero-shear. For example, a fluid comprising a given a non-associated polymer (i.e., one that is not part of an entangled equilibrium polymer network) with a known molecular weight (MW1) will have a given intrinsic viscosity (V1) in a treatment fluid at zero shear. A fluid comprising the same polymer with the same molecular weight (MW1) that has formed an entangled equilibrium polymer network through molecular associations as described above will have a higher viscosity (V2) at zero shear as compared to V1 at zero shear. A higher V2 indicates that a entangled equilibrium polymer network has formed in the fluid.

Figure 5:
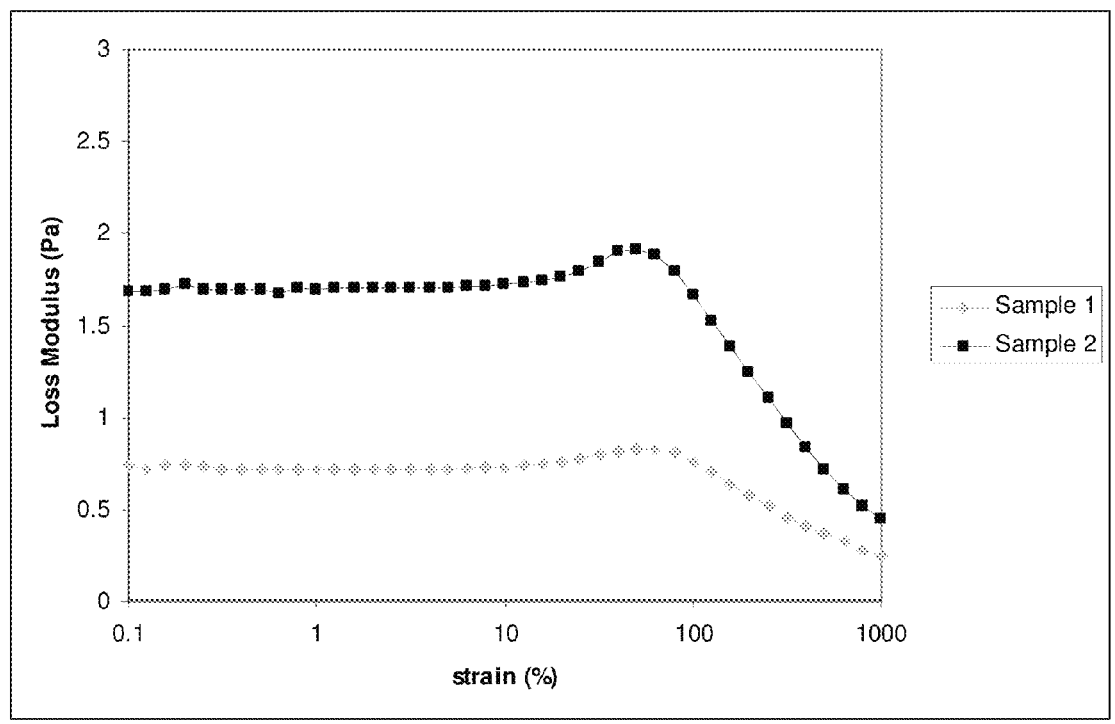
FIG. 5 is a graphical representation of the loss modulus of a treatment fluid comprising the entangled equilibrium polymer networks versus a treatment fluid comprising surfactants without polymers.
Figure 6A:
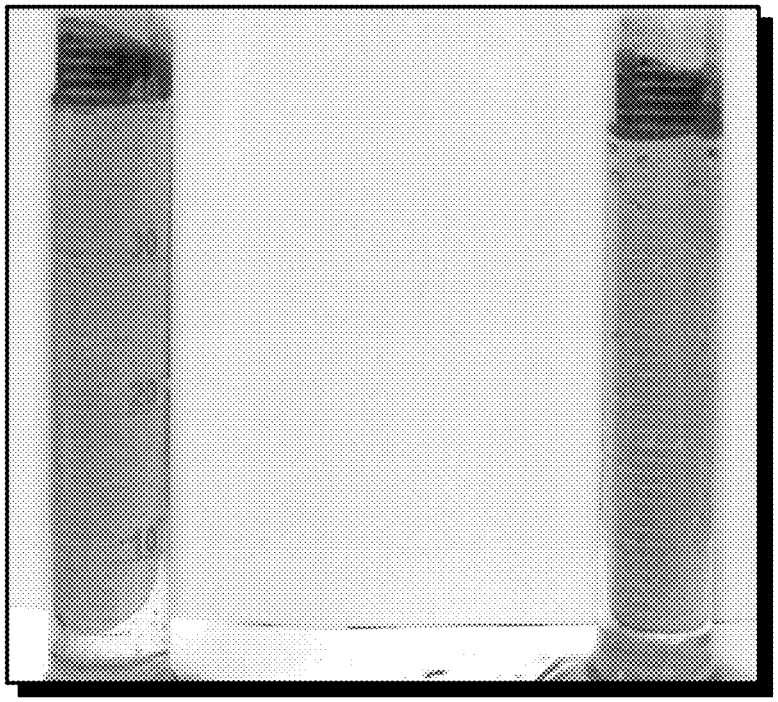
FIG. 6 is a picture depicting the settling properties of a treatment fluid comprising the entangled equilibrium polymer networks versus a treatment fluid comprising surfactants without polymers in the absence (A) and presence (B) of heat.
Figure 6B:
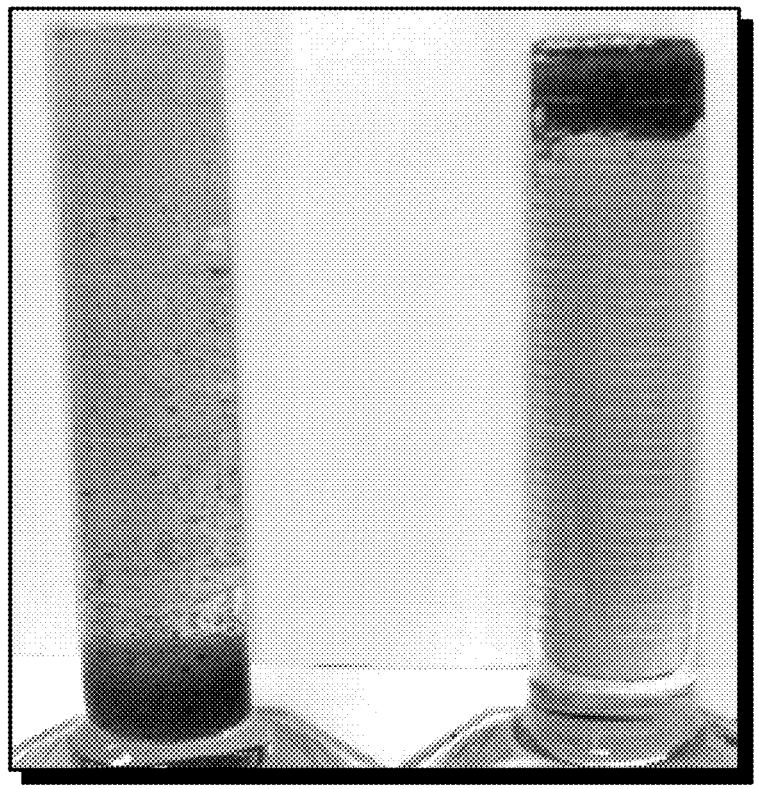

The following discussion is in reference to FIG. 5 and FIG. 6. The shear modulus (resulting from changing strain) is the ratio of the shear stress to the shear strain. It follows from the complex relationship similar to the above that:

$$G^* = G' + iG'' \quad \text{(Equation 3)}$$

where $G^*$ is the complex shear modulus, $G'$ is the in-phase storage modulus (i.e., elastic component) and $G''$ is the out-of-phase similarly-directed loss modulus (viscous component); $G^* = \sqrt{(G'2 + G''2)}$. The frequency where these parameters cross over corresponds to a relaxation time ($\tau$) specific for the material. Thus, it follows that, $$\tan(\delta) = G''/G' \quad \text{(Equation 4)}$$

where $\tan(\delta)$ quantifies the balance between energy loss and storage. As $\tan(45°) = 1$, a value for $\tan(\delta)$ greater than unity indicates more "liquid-like" properties, whereas one lower than unity means more "solid-like" properties, regardless of the viscosity. For treatment fluids comprising entangled equilibrium polymer networks, the $\tan(\delta)$ would likely be less than 1, whereas fluids comprising non-associative polymers would have a $\tan(\delta)$ closer to 1 or equal to 1 if not above 1.

Figure 3:
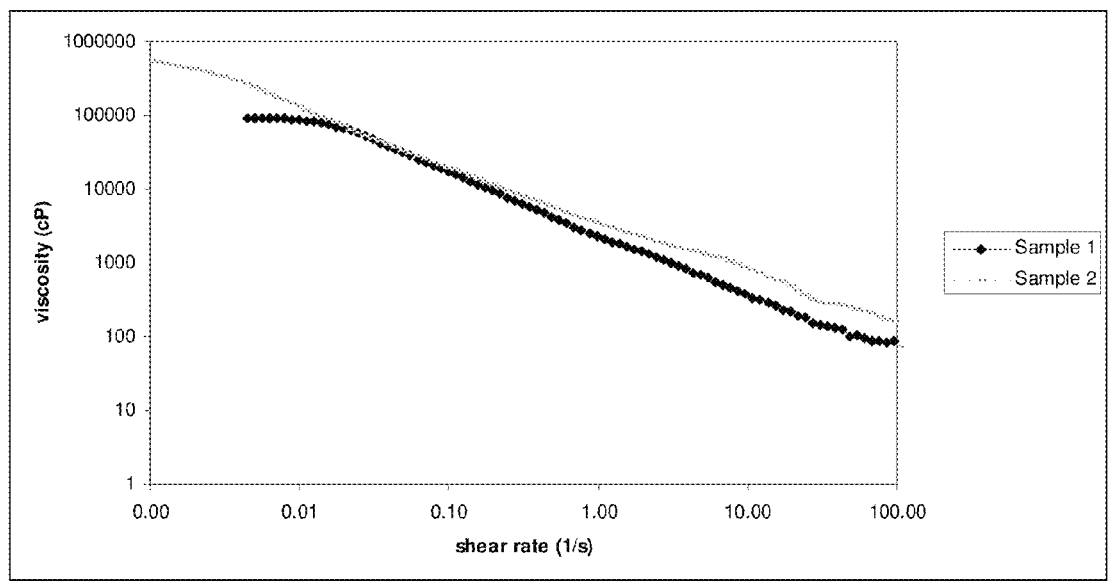
FIG. 3 is a graphical representation of the rheological performance of a treatment fluid comprising the entangled equilibrium polymer networks versus a treatment fluid comprising surfactants without polymers.

FIG. 3 provides an example of the various responses from dynamic shear testing. The treatment fluids comprising entangled equilibrium polymer networks (Sample 2) develop viscoelastic character and have a higher elastic modulus versus the purely viscous solution from the viscoelastic surfactants alone (Sample 1). The elastic component remains until enough shear is applied to disrupt the associations resulting in thixotropic behavior. Such properties result in increased suspension of entangled equilibrium polymer networks.

Another way to understand this rheological phenomena associated with treatment fluids that comprise entangled equilibrium polymer networks versus those that have non-associated polymer is to examine the slopes of the rheological curves for these treatment fluids. The slope of the rheological curve for the treatment fluid comprising the entangled equilibrium polymer networks will vary greatly from the slope of the rheological curve for the treatment fluids comprising the non-associated polymer.

The entangled equilibrium polymer networks are thought to impart increased YP, low shear viscosity (or zero shear viscosity), and overall improved suspension without substantially increasing the PV of the treatment fluid. A low PV may help minimize the amount of effective density increase, or equivalent circulating density, caused by pumping the fluid. In certain embodiments, the YP values in the treatment fluids may range from about 2 to about 100 and the PV values may range from about 5 to about 50. Additionally, the entangled equilibrium polymer networks when formed in the aqueous treatment fluid are thought to improve the suspension characteristics of the fluid. These values and effects may be influenced by many factors including, but not limited to, temperature, pressure, and solubility.

In some embodiments, a fluid comprising an entangled equilibrium polymer network is able to maintain structure in a yield stress range up to about 4 Pa.

The nature of the associations in the entangled equilibrium polymer network depends on a variety of factors, including, but not limited to, the degree of hydrophobic modification on the polymer, the microstructure of the polymer, the type of surfactant used, and the concentration of the polymer and the surfactant in the fluid. In certain embodiments, intrapolymer interactions may become more prominent at low polymer concentrations and high hydrophobe density along the hydrophilic polymer backbone. In such embodiments, a compact, globular conformation may be formed giving rise to organized, hydrophobic microdomains in the network with micelle-like properties. In other embodiments, interpolymer interactions may be more prominent, usually at lower hydrophobe/hydrophile ratios and at higher polymer concentrations. The high polymer concentration may lead to chain overlap and hydrophobic clustering that increases the viscosity of the treatment fluid by forming an entangled equilibrium polymer network. One of ordinary skill in the art, with the benefit of this disclosure, will recognize the conditions necessary to obtain the proper intrapolymer and interpolymer associations to form the entangled equilibrium polymer networks of the present invention.

In certain embodiments, intramicellar interactions may become more prominent at low surfactant concentrations. In such embodiments, a compact, globular conformation may be formed giving rise to organized, worm-like micelles. In other embodiments, intermicellar and micellar-polymer interactions may be more prominent, usually at higher concentrations of surfactant. The high surfactant concentration may lead to chain overlap and hydrophobic clustering that increases the viscosity of the treatment fluid by forming an entangled equilibrium polymer network. One of ordinary skill in the art, with the benefit of this disclosure, will recognize the conditions necessary to obtain the proper intramicellar, intermicellar, and micllar-polymer associations to form the entangled equilibrium polymer networks of the present invention.

The viscoelastic surfactants used in the present invention may comprise any viscoelastic surfactant known in the art, any derivative thereof, or any combination thereof. These viscoelastic surfactants may be an anionic surfactant, a neutral surfactant, a cationic surfactant, a catanionic surfactant, a zwitterionic surfactant, or any combination thereof. The viscoelastic surfactants may comprise any number of different compounds, including methyl ester sulfonates (e.g., as described in U.S. Pat. Nos. 7,299,874, 7,159,659, and 7,303,019 and U.S. Published Application No. 2006/0183646, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,879,699, the relevant disclosure of which is incorporated herein by reference. Suitable viscoelastic surfactants also may comprise "catanionic" surfactant systems, which comprise paired oppositely-charged surfactants that act as counterions to each other and may form wormlike micelles. Examples of such catanionic surfactant systems include, but are not limited to sodium oleate (NaO)/octyl trimethylammonium chloride ($C_8TAC$) systems, stearyl trimethylammonium chloride ($C_{18}TAC$)/caprylic acid sodium salt (NaCap) systems, and cetyl trimethylammonium tosylate (CTAT)/sodium dodecylbenzenesulfonate (SDBS) systems.

Examples of commercially-available viscoelastic surfactants suitable for use in the present invention may include, but are not limited to, Mirataine "BET-O 30" (an oleamidopropyl betaine surfactant available from Rhodia Inc., Cranbury, N.J.), "AROMOX APA-T" (amine oxide surfactant available from Akzo Nobel Chemicals, Chicago, Ill.), "ETHOQUAD O/12 PG" (a fatty amine ethoxylate quat surfactant available from Akzo Nobel Chemicals, Chicago, Ill.), "ETHOMEEN T/12" (a fatty amine ethoxylate surfactant available from Akzo Nobel Chemicals, Chicago, Ill.), "ETHOMEEN S/12" (a fatty amine ethoxylate surfactant available from Akzo Nobel Chemicals, Chicago, Ill.), and "REWOTERIC AM TEG" (a tallow dihydroxyethyl betaine amphoteric surfactant available from Degussa Corp., Parsippany, N.J.).

The viscoelastic surfactant should be present in a fluid of the present invention in an amount sufficient to impart the desired viscosity (e.g., sufficient viscosity to divert flow, reduce fluid loss, suspend particulates, etc.) to the fluid. In certain embodiments, the viscoelastic surfactant may be present in the fluid in an amount in the range of from about 0.1% to about 20% by weight of the fluid. In certain embodiments, the viscoelastic surfactant may be present in an amount in the range of from about 0.5% to about 10% by weight of the fluid. In certain embodiments, the viscoelastic surfactant may be present in an amount in the range of from about 0.5% to about 3% by weight of the fluid.

The network forming polymers that may be used to form the entangled equilibrium polymer networks of the present invention may be synthesized by incorporating hydrophobic groups within a hydrophilic polymer backbone of a base polymer using any suitable method. Suitable methods include chain growth polymerization, step growth polymerization, and post-polymerization mechanisms for naturally occurring polymers and polymers that were made by chain or step growth polymerization. In most instances, this is not a post-polymerization modification. Thus, the hydrophobic modification is incorporated within the polymer structure as it forms. However, in some instances, this modification may be performed post-polymerization, for example, through a suitable modification reaction. Residual monomer may remain in the polymer. Such modified polymers are referred to herein as network forming polymers.

Suitable examples of hydrophobic modifications for use in embodiments of the present invention include those formed by the addition of a hydrocarbon group having from about 1 to about 24 carbon atoms that, for example, may comprise a linear or branched alkyl, alkenyl, aryl, alkylaryl, arylalkyl, cycloalkyl, acryloyl, or a mixture thereof. In some embodiments, the hydrocarbon groups may comprise 3 to 16 carbon atoms.

In certain embodiments, the network forming polymer or polymers may have a molecular weight in the range from about 500,000 to about 10,000,000. In some embodiments, the molecular weight range may be in the 1,000,000 range+/−500,000. In some embodiments, this molecular weight may vary. One of ordinary skill in the art with the benefit of this disclosure will recognize the appropriate size for a given application.

Suitable network forming polymers may include, but are not necessarily limited to, those that comprise units based on: acrylamides, vinyl alcohols, vinylpyrrolidones, vinylpyridines, acrylates, polyacrylamides, polyvinyl alcohols, polyvinylpyrrolidones, polyvinylpyridines, polyacrylates, polybutylene succinate, polybutylene succinate-co-adipate, polyhydroxybutyrate-valerate, polyhydroxybutyrate-covalerate, polycaprolactones, polyester amides, polyethylene terephthalates, sulfonated polyethylene terephthalate, polyethylene oxides, polyethylenes, polypropylenes, aliphatic aromatic copolyester, polyacrylic acids, polysaccharides (such as dextran or cellulose), chitins, chitosans, proteins, aliphatic polyesters, polylactic acids, poly(glycolides), poly(ε-caprolactones), poly(hydroxy ester ethers), poly(hydroxybutyrates), poly(anhydrides), polycarbonates, poly(orthoesters), poly(amino acids), poly(ethylene oxides), poly(propylene oxides), poly(phosphazenes), polyester amides, polyamides, polystyrenes, any derivative thereof, any copolymer, homopolymer, or terpolymer, or any combination thereof. In a further option, the polymer may comprise a compound selected from the group consisting of hydroxyethyl acrylate, acrylamide and hydroxyethyl methacrylate.

The network forming polymers of the present invention should be added to the aqueous base fluid in an amount sufficient to form the desired entangled equilibrium polymer networks within the treatment fluid. The network forming polymers should be included in the treatment fluids of the present invention in any amount sufficient for a particular application. In certain embodiments, the network forming polymers may be present in amount in the range of about 0.01% to about 15% by weight of the treatment fluid. In certain embodiments, the networking forming polymers may be present in an amount of about 0.1% to about 2% by weight of the treatment fluid. A person of ordinary skill in the art, with the benefit of this disclosure, will recognize the necessary amount of network forming polymer or polymers to include in a particular application of the present invention depending on, among other factors, the other components of the treatment fluids, the desired properties of the entangled equilibrium polymer networks in the treatment fluids, and the like.

In certain embodiments, the network forming polymers of the entangled equilibrium polymer networks may be linear or branched. In some instances, linear polymer backbones may have better associative properties since they may be able to fold back and forth with less steric hindrance.

In some embodiments, the monomer that will form a polymer may include an unsaturated group, such as a monomer including a vinyl group. Exemplary vinyl-containing monomers may be described by the formula $C(R1)(R2)=C(R3)(R4)$, wherein R1, R2, R3 and R4 are segments rendering the solubility or swellability of this monomer in a common solvent. Optionally, R1, R2, R3 and R4 can each be independently selected from, but not limited to, hydrogen, methyl, ethyl, $CONH_2$, $CONHCH_3$, $CON(CH_3)_2$, $CH_2SO_3H$, $CH_2SO_3Na$, and $COONa$.

In some embodiments, the network forming polymers may be formed by a reaction mechanism incorporating an initiator. Suitable initiators may include radical initiators. Examples of suitable initiators may include, but are not limited to, 2,2'-azobis-(2-methylbutyronitrile), 2,2'-azobis(isobutyramidine hydrochloride), 2,2'-azobis[2-(2-imidazolin-2-yl)propane] dihydrochloride, 1,1'-azobis(cyclohexanecarbonitrile), 2,2'-azobis(2-methylpropanamidine) dihydrochloride, 4,4'-azobis(4-cyanovaleric acid), ammonium persulfate, hydroxymethanesulfinic acid monosodium salt dihydrate, potassium persulfate, sodium persulfate, benzoyl peroxide, 1,1-bis(tert-amylperoxy)cyclohexane, 1,1-bis(tert-butylperoxy)cyclohexane, 2,2-bis(tert-butylperoxy)butane, 2,4-pentanedione peroxide, 2,5-bis(tert-butylperoxy)-2,5-dimethylhexane, 2,5-di(tert-butylperoxy)-2,5-dimethyl-3-hexyne; 2-butanone peroxide, cumene hydroperoxide, di-tert-amyl peroxide, dicumyl peroxide, lauroyl peroxide, tert-butyl hydroperoxide, tert-butyl peracetate, tert-butyl peroxide, tert-butyl peroxybenzoate, tert-butylperoxy-2-ethylhexyl carbonate, diethylene glycol dimethacrylate, azobisisobutyronitrile, and any combination thereof. A person of ordinary skill in the art would be able to select an appropriate initiator based upon the network forming polymer or monomer involved in the particular reaction. Other suitable initiators may include photoinitiators, thermal initiators, and any combination thereof.

In certain embodiments of the present invention, the hydrophilic network forming polymers comprise a polymer backbone, the polymer backbone comprising polar heteroatoms, wherein the polar heteroatoms present within the polymer backbone of the hydrophilic network forming polymers include, but are not limited to, oxygen, nitrogen, sulfur, or phosphorous.

The surfactants that may be used to facilitate the formation of the associations in the entangled equilibrium polymer networks may be anionic, neutral, cantionic, catanionic, or zwitterionic. It is believed that the hydrophobic groups of the network forming polymers may become incorporated into spherical surfactant micelles, which may act as a type of crosslinker. A surfactant may be used to improve stability of the treatment fluid, such as the treatment fluid of the present invention, by improving the formation of microdomains through the formation of "hemi-micelle" junctions that help stabilize and solubilize the hydrophobic interactions. The interactions between the network forming polymers and spherical micelles differ from the interactions formed in the entangled equilibrium polymer networks of the present invention. The interactions in the entangled equilibrium polymer networks are chain entanglement between the network forming polymer chains and the worm-like micelle structures formed by the surfactant interactions.

The treatment fluids of the present invention generally comprise an aqueous base. Suitable aqueous base fluids may comprise, among other things, fresh water, saltwater (e.g., water containing one or more salts dissolved therein), brine, seawater, and/or any combination thereof. Generally, the water may be from any source, provided that it does not contain components that might adversely affect the stability and/or performance of the fluids of the present invention. In certain embodiments, the density of the aqueous base fluid can be adjusted, among other purposes, to provide additional particle transport and suspension in the fluids of the present invention and/or to facilitate dissolving the viscoelastic surfactant into the aqueous base fluid. In certain embodiments, the pH of the aqueous base fluid may be adjusted (e.g., by a buffer or other pH adjusting agent), among other purposes, to reduce the viscosity of the fluid (e.g., activate a breaker or other additive). In these embodiments, the pH may be adjusted to a specific level, which may depend on, among other factors, the type(s) of viscoelastic surfactant(s), network foaming polymers, salts, and other additives included in the fluid. One of ordinary skill in the art, with the benefit of this disclosure, will recognize when such density and/or pH adjustments are appropriate.

Preferably, the treatment fluids of the present invention may be broken with shear to aid pumpability and recovery of the treatment fluid. In certain embodiments, the entangled equilibrium polymer networks may reform in the absence of shear to re-viscosify the treatment fluid. If a chemical breaker is used, one should note that this reversability characteristic may be altered.

Additional additives may be included in the treatment fluids of the present invention as desired for a particular application, including, but not limited to, bridging agents, polyols, fluid loss control agents, pH-adjusting agents, pH buffers, shale stabilizers, and any combination thereof. For example, polyols may be included in a treatment fluid and may improve thermal stability. Furthermore, a variety of additional additives suitable for use in the chosen operation may be included in the treatment fluid as deemed appropriate by one skilled in the art, with the benefit of this disclosure.

In some embodiments, the treatment fluids of the present invention may have increased thermal stability when in the presence of brine versus water. In certain embodiments, the increase in thermal stability can be attributed to the minimization of the hydrolytic attack due to decreased free water in the treatment fluid. In other embodiments, it is believed that the increase in thermal stability in aqueous base fluid may be due to changing the contact of the aqueous media with the backbone of the polymer chains, e.g., by facilitating the protection of the acetal linkage (e.g., 1,4-glycocidic linkage) of the backbone. The acetal linkage is thought to be generally unprotected in non-associated unmodified polymers.

The treatment fluids of the present invention optionally may comprise a pH buffer. The pH buffer may be included in the treatment fluids of the present invention to maintain pH in a desired range, inter alia, to enhance the stability of the treatment fluid. Examples of suitable pH buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, magnesium oxide, sulfamic acid, and the like. The pH buffer may be present in a treatment fluid of the present invention in an amount sufficient to maintain the pH of the treatment fluid at a desired level. One of ordinary skill in the art, with the benefit of this disclosure, will recognize the appropriate pH buffer and amount of pH buffer to use for a chosen application.

Optionally, the treatment fluids of the present invention further may include pH-adjusting compounds for adjusting the pH of the treatment fluid, inter alia, to a desired pH for the desired operation. Suitable pH-adjusting compounds include any pH-adjusting compound that does not adversely react with the other components of the treatment fluid. Examples of suitable pH-adjusting compounds include, but are not limited to, sodium hydroxide, potassium hydroxide, lithium hydroxide, sodium carbonate, potassium carbonate, fumaric acid, formic acid, acetic acid, acetic anhydride, hydrochloric acid, hydrofluoric acid, citric acid, hydroxyfluoboric acid, polyaspartic acid, polysuccinimide, ammonium diacetate, sodium diacetate, and sulfamic acid. The appropriate pH-adjusting compound and amount thereof may depend upon the formation characteristics and conditions, and other factors known to individuals skilled in the art with the benefit of this disclosure.

The treatment fluids of the present invention may comprise shale stabilizers. Examples of suitable shale stabilizers include, but are not limited to, long chain alcohols, polyols, amine inhibitor, sodium or potassium silicate, partially hydrolyzed polyacrylamides, polyalkene glycols, anionic surfactants, salt solutions containing, for example, sodium chloride, potassium chloride, or ammonium chloride; cationic polymers and oligomers, for example, poly(dimethyl-diallylammonium chloride), cationic poly(acrylamide) and cationic poly(diemethylaminoethylmethacrylate). Generally, introducing the fluid containing the shale stabilizer into the portion comprises squeezing the fluid into the porosity of the portion of the subterranean formation so that the shale stabilizer acts to at least partially stabilize the portion of the subterranean formation, e.g., by reducing the propensity of shale present in the portion of the subterranean formation to swell or migrate.

Optionally the treatment fluids of the present invention may comprise polyols to aid in thinning or thickening the solution depending on the desired properties. Suitable polyols are those aliphatic alcohols containing two or more hydroxy groups. It is preferred that the polyol be at least partially water-miscible. Examples of suitable polyols that may be used in the aqueous-based treatment fluids of this invention include, but are not limited to, water-soluble diols such as ethylene glycols, propylene glycols, polyethylene glycols, polypropylene glycols, diethylene glycols, triethylene glycols, dipropylene glycols and tripropylene glycols, any combination of these glycols, their derivatives, and reaction products formed by reacting ethylene and propylene oxide or polyethylene glycols and polypropylene glycols with active hydrogen base compounds (e.g., polyalcohols, polycarboxylic acids, polyamines, or polyphenols). The polyglycols of ethylene generally are thought to be water-miscible at molecular weights at least as high as 20,000. The polyglycols of propylene, although giving slightly better grinding efficiency than the ethylene glycols, are thought to be water-miscible up to molecular weights of only about 1,000. Other glycols possibly contemplated include neopentyl glycol, pentanediols, butanediols, and such unsaturated diols as butyne diols and butene diols. In addition to the diols, the triol, glycerol, and such derivatives as ethylene or propylene oxide adducts may be used. Other higher polyols may include pentaerythritol. Another class of polyhydroxy alcohols contemplated is the sugar alcohols. The sugar alcohols are obtained by reduction of carbohydrates and differ greatly from the above-mentioned polyols. Any combination or derivative of these are suitable as well.

The choice of polyol to be used is largely dependent on the desired density of the fluid. Other factors to consider include thermal conductivity. For higher density fluids (e.g., 10.5 ppg or higher), a higher density polyol may be preferred, for instance, triethylene glycol or glycerol may be desirable in some instances. For lower density applications, ethylene or propylene glycol may be used. In some instances, more salt may be necessary to adequately weight the fluid to the desired density. In certain embodiments, the amount of polyol that should be used may be from about 40% to about 99% by volume of the treatment fluid.

The treatment fluids of the present invention may comprise bridging agents. Preferably, when used, the bridging agents are either non-degradable, self-degrading or degradable in a suitable clean-up solution (e.g., a mutual solvent, water, an acid solution, etc.). Examples of bridging agents suitable for use in the methods of the current invention include, but are not necessarily limited to, magnesium citrate, calcium citrate, calcium succinate, calcium maleate, calcium tartrate, magnesium tartrate, bismuth citrate, calcium carbonate, sodium chloride and other salts, and the hydrates thereof. Examples of degradable bridging agents may include, but are not necessarily limited to, bridging agents comprising degradable materials such as degradable polymers. Specific examples of suitable degradable polymers include, but are not necessarily limited to, polysaccharides such as dextrans or celluloses; chitins; chitosans; proteins; orthoesters; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Any combination or derivative of these are suitable as well. One suitable commercially available lightweight particulate is a product known as "BIO-VERT®" fluid loss material, manufactured by Halliburton Energy Services, located in Duncan, Okla. "BIOVERT®" fluid loss material is a polymer material comprising 90-100% polylactide and having a specific gravity of about 1.25.

When choosing a particular bridging agent to use, one should be aware of the performance of that bridging agent at the temperature range of the application. The bridging agents utilized may be generally present in the drilling fluid compositions in an amount in the range of from about 1% to about 40% by weight thereof, more preferably from about 5% to about 25%. Generally, the bridging agents may have a particle size in the range of from about 1 micron to about 600 microns. Preferably, the bridging particle size is in the range of from about 1 to about 200 microns but may vary from formation to formation. The particle size used is determined by the pore throat size of the formation.

The treatment fluids of the present invention also may comprise suitable fluid loss control agents. Any fluid loss agent that is compatible with the treatment fluids of the present invention is suitable for use in the present invention. Examples include, but are not limited to, microgels, starches, silica flour, gas bubbles (energized fluid or foam), benzoic acid, soaps, resin particulates, relative permeability modifiers, degradable gel particulates, diesel dispersed in fluid, and other immiscible fluids. Another example of a suitable fluid loss control additive is one that comprises a degradable polymer, such as those listed above. If included, a fluid loss additive should be added to a treatment fluid of the present invention in an amount necessary to give the desired fluid loss control. In some embodiments, a fluid loss additive may be included in an amount of about 5 to about 2000 lbs/Mgal of the treatment fluid. In some embodiments, the fluid loss additive may be included in an amount from about 10 to about 50 lbs/Mgal of the treatment fluid. For some liquid additives like diesel, these may be included in an amount from about 0.01% to about 20% by volume; in some embodiments, these may be included in an amount from about 1.0% to about 10% by volume.

In accordance with embodiments of the present invention, the treatment fluids of the present invention that comprise an entangled equilibrium polymer network may be used in a variety of suitable applications. By way of example, the treatment fluids may be used in subterranean operations, including, but not limited to, drilling operations, underbalanced drilling operations, overbalanced drilling operations, acidizing operations, gravel-packing operations, fracturing operations, completion operations, and cementing operations. Among other things, the treatment fluids may be used in subterranean fluids as drilling fluids, drill-in fluids, cement fluids, spacer fluids, pills, and the like.

In one embodiment, the present invention provides a method comprising: providing a treatment fluid comprising at least one entangled equilibrium polymer network, and placing the treatment fluid in a subterranean formation.

In one embodiment, the present invention provides a method comprising: providing a drilling fluid comprising at least one entangled equilibrium polymer network; and using the drilling fluid to drill at least a portion of a well bore in a subterranean formation. Embodiments of the present invention may include circulating the drilling fluid in a well bore while drilling.

An example method of the present invention generally may comprise providing a treatment fluid comprising at least one entangled equilibrium polymer network; and introducing the treatment fluid into the subterranean formation having a bottom hole temperature of about 275° F. or more.

In certain embodiments, as shown in the example below, the method further may comprise allowing the entangled equilibrium polymer network to maintain thermal stability and gel strength at temperatures up to about 350° F. In an embodiment, the treatment fluid comprising at least one entangled equilibrium polymer network may maintain a plastic viscosity of at least 20 at a temperature of 350° F. and below.

In some embodiments, where the treatment fluids of the present invention are used in a fracturing operation, a portion of the subterranean formation may be contacted with the treatment fluid so as to create or enhance one or more fractures therein, the treatment fluid comprising an entangled equilibrium polymer network. The desired formulation of the treatment fluids would be determined to obtain desired rheology.

In other embodiments, wherein the treatment fluids of the present invention are used in a frac pack operation, a portion of the subterranean formation may be contacted with the treatment fluids so as to create or enhance one or more fractures therein, the treatment fluids comprising an aqueous base fluid, an entangled equilibrium polymer network, and a proppant particulate (e.g., gravel).

In other embodiments, the treatment fluids of the present invention may be placed into the well bore as a pill either prior to or after the stabilization of unconsolidated formation particulates in a section of the subterranean formation penetrated by the well bore. The desired volume of the treatment fluids of the present invention introduced into the well bore is based, among other things, on several properties of the section to be treated, such as depth and volume of the section, as well other physical properties of material in the section. The treatment fluid may reduce fluid loss into the formation from other fluids (e.g., carrier fluids or completion fluids) that may be introduced into the well bore subsequent to the treatment fluid and reduce the subsequent problems associated with water flowing into the well bore from the subterranean formation.

In another embodiment of the present invention, the treatment fluids may be placed into the subterranean formation as a viscosified pill during an underbalanced drilling operation. An underbalanced drilling operation may be referred to as a managed pressure drilling operation by some skilled in the art. Influxes from the formation may be experienced during an underbalanced drilling operation. Nitrogen may be used to combat this. The treatment fluids may be recovered by pumping gas into the formation to lift the pill out of the subterranean formation.

Another example of a method of the present invention comprises using the treatment fluids prior to a cementing operation. In one embodiment, such a method may comprise: providing a treatment fluid comprising at least one entangled equilibrium polymer network; introducing the treatment fluid into a subterranean formation; allowing the treatment fluid to suspend and carry particulates from the well bore to the surface of a well site located above the subterranean formation; introducing a cement composition into the subterranean formation; and allowing the cement to set in the well bore. The set cement should have a tighter bond with the formation as a result.

To facilitate a better understanding of the present invention, the following representative examples of certain aspects of some embodiments are given. In no way should the following examples be read to limit, or define, the scope of the invention.

EXAMPLES

The following examples are submitted for the purpose of demonstrating the performance characteristics of treatment fluids comprising the entangled equilibrium polymer networks of the present invention. These tests were conducted substantially in accordance with the test methods described in ANSI/API RP 13B-2: Recommended Practice for Field Testing Oil-based Drilling Fluids (as noted above).

Example 1

Figure 2A:
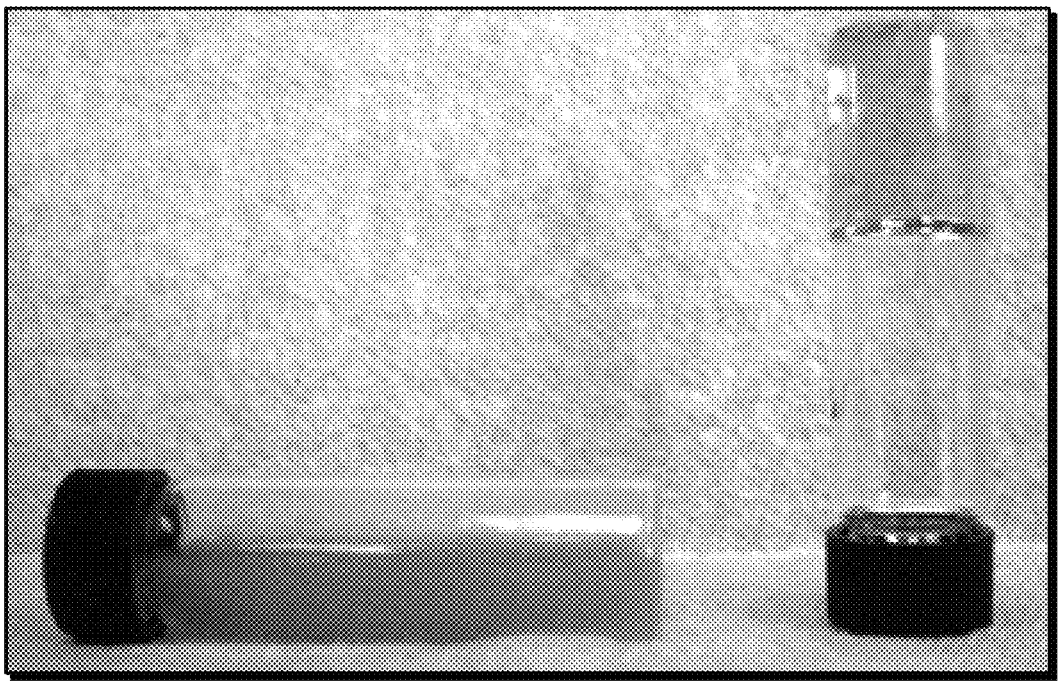
FIG. 2 is a picture of treatment fluids containing standard surfactants with and without hydrocarbon (A) versus treatment fluids containing the entangled equilibrium polymers with and without hydrocarbon (B).
Figure 2B:
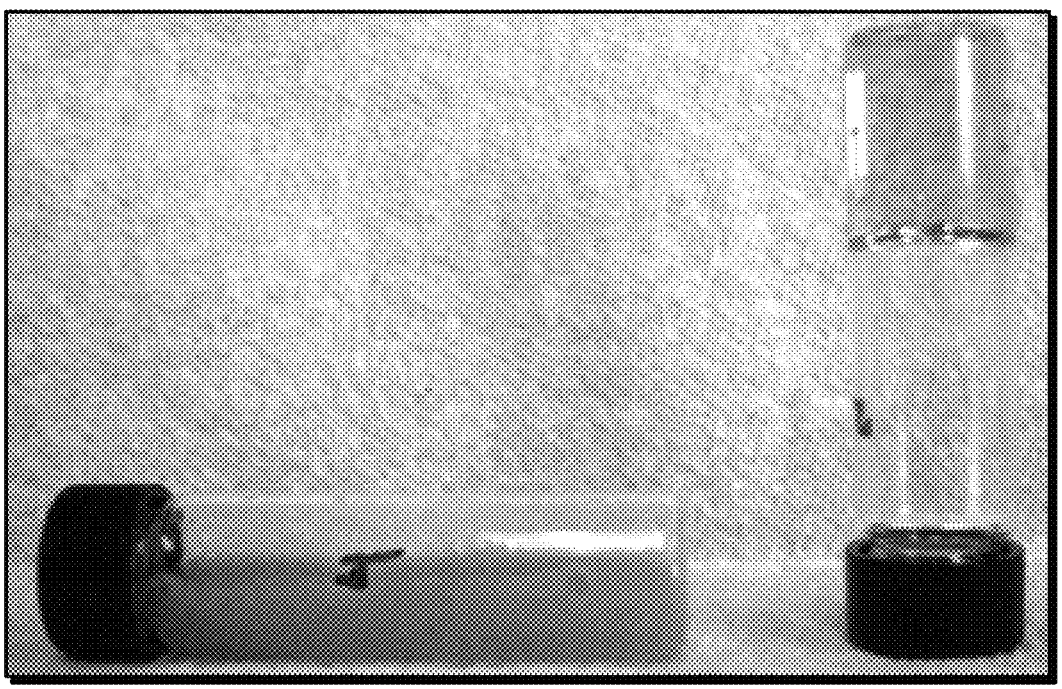

Several different network forming polymers were added to a viscoelastic fluid system including hydrophobically modified hydroxyethylcellulose (HMHEC). The effect of HMHEC (BDF-488) on catanionic viscoelastic systems has been proven in the laboratory showing viscosity increases of 10-fold with only a 0.5 wt-% loading, as depicted by FIG. 1. The viscosity of these fluids has also been shown to break with the addition of only 2 volume-% hydrocarbon, as shown in FIG. 2. The results indicate the overall effectiveness of using both network forming polymers and viscoelastic surfactants in combination to form better treatment fluids.

Example 2

Figure 4:
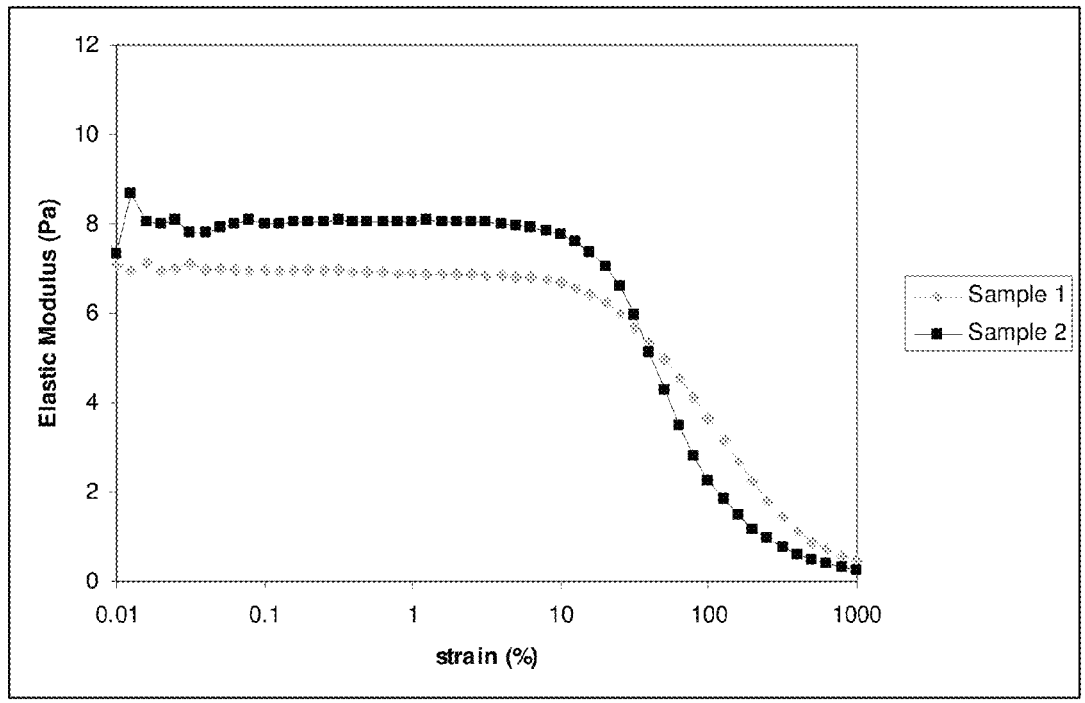
FIG. 4 is a graphical representation of the elastic modulus of a treatment fluid comprising the entangled equilibrium polymer networks versus a treatment fluid comprising surfactants without polymers.

The effect of the entangled equilibrium polymer networks on rheology was further explored with a different catanionic system, alkylamidopropyl dimethylamine oxide/sodium octyl sulfate mixed at an 8:2 weight ratio and run at 3 total weight-% surfactant in water. Shear rate and shear stress sweeps were performed using a cone and plate geometry. All rheological testing for these fluids was performed at 80° F. and in 11.4 ppg calcium bromide brine. Sample 1 is the viscoelastic surfactant alone and Sample 2 is the surfactant/polymer system with 0.25 weight-% polymer added. FIG. 2 shows the higher zero-shear viscosity of the fluid with added polymer, which was almost an order of magnitude larger (600,000 cP versus 90000 cP). This higher zero-shear viscosity showed the enhanced structure building effect of treatment fluids comprising the entangled equilibrium polymer network, which resulted in stronger gels and carrying capacity. The treatment fluids comprising the entangled equilibrium polymer networks also exhibited a higher viscosity at higher shear rate due to added polymer being of a quenched molecular weight, imparting a higher intrinsic viscosity. The effect of the formation of entangled equilibrium polymer networks in the treatment fluids on the elastic properties of the treatment fluid can be seen in FIG. 4. A higher elastic modulus was observed for the treatment fluid comprising at least one entangled equilibrium polymer network due to the associations between the network forming polymer and the wormlike micelles. A higher loss modulus was also observed, as shown in FIG. 5, for the treatment fluid comprising at least one entangled equilibrium polymer network, as would be expected since it had a higher viscosity.

Example 3

The effect of the entangled equilibrium polymer networks on the settling properties of the treatment fluids was further explored with a different catanionic system, alkylamidopropyl dimethylamine oxide/sodium octyl sulfate mixed at an 8:2 weight ratio and run at 4.8 total weight-% surfactant in water. Shear rate and shear stress sweeps were performed using a cone and plate geometry. All rheological testing for these fluids was performed at 80° F. and in 11.4 ppg calcium bromide brine. The sample on the right was a treatment fluid comprising the entangled equilibrium polymer networks at 0.19 total weight-% of network forming polymer in water. 20/40 frac sand was added to both samples and the treatment fluids were heated at 160° F. for 20 minutes. The results are shown in FIG. 6A (without heat) and 6B (with heat). The sand in the sample comprising surfactant without polymers settled to the bottom due to the decrease in average micellar length. The sample comprising the entangled equilibrium polymer networks prevented the sand settling due to strong interactions with the micelles.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid comprising an aqueous base fluid and at least one entangled equilibrium polymer network
      wherein the entangled equilibrium polymer network comprises a viscoelastic surfactant and network forming material;

wherein the network forming material is a hydrophobically modified polymer having a backbone selected from the group consisting of a monomer or polymer that comprises: a vinylpyrrolidone, a vinylpyridine, a polyvinylpyrrolidone, a polyvinylpyridine, a polybutylene succinate, a polybutylene succinate-co-adipate, a polyhydroxybutyrate-valerate, a polyhydroxybutyrate-covalerate, a polycaprolactone, a polyester amide, a sulfonated polyethylene terephthalate, a poly($\epsilon$-caprolactone), a poly(phosphazene), any copolymer thereof, any homopolymer thereof, any terpolymer thereof, and any combination thereof;

wherein the viscosity of the treatment fluid at zero shear is higher than the viscosity at zero shear of a fluid comprising the network forming material alone and, placing the treatment fluid in a subterranean formation.

2. The method of claim 1 wherein the entangled equilibrium polymer network comprises a network forming polymer in an amount of about 0.01% to about 15% by weight of the treatment fluid.

3. The method of claim 1 wherein the entangled equilibrium polymer network comprises at least one surfactant selected from the group consisting of: an anionic surfactant, a neutral surfactant, a cationic surfactant, a catanionic surfactant, a zwitterionic surfactant, and any combination thereof.

4. The method of claim 3 wherein the surfactant is present in the treatment fluid in an amount of from about 0.1% to about 20% by weight of the treatment fluid.

5. The method of claim 1 wherein the treatment fluid further comprises at least one brine.

6. The method of claim 1 wherein the treatment fluid has a yield point value of from about 2 to about 100 and a plastic viscosity value of from about 5 to about 50.

7. The method of claim 1 wherein the entangled equilibrium polymer network maintains structure in a yield stress range up to about 4 Pa.

8. The method of claim 1 wherein placing the treatment fluid in a subterranean formation involves a subterranean operation selected from the group consisting of a drilling operation, a drill-in operation, an underbalanced drilling operation, an overbalanced drilling operation, an acidizing operation, a gravel-packing operation, a fracturing operation, a frac-pack operation, a completion operation, and a cementing operation.

9. The method of claim 1 wherein the treatment fluid has a plastic viscosity of at least 20 at a temperature of 350° F. and below.

10. A method comprising:
providing a treatment fluid having a first viscosity comprising an aqueous base fluid and at least one entangled equilibrium polymer network;
wherein the entangled equilibrium polymer network comprises a viscoelastic surfactant and network forming material;
wherein the network forming material is a hydrophobically modified polymer having a backbone selected from the group consisting of a monomer or polymer that comprises: a vinylpyrrolidone, a vinylpyridine, a polyvinylpyrrolidone, a polyvinylpyridine, a polybutylene succinate, a polybutylene succinate-co-adipate, a polyhydroxybutyrate-valerate, a polyhydroxybutyrate-covalerate, a polycaprolactone, a polyester amide, a sulfonated polyethylene terephthalate, a poly($\epsilon$-caprolactone), a poly(phosphazene), any copolymer thereof, any homopolymer thereof, any terpolymer thereof, and any combination thereof;
wherein the viscosity of the treatment fluid at zero shear is higher than the viscosity at zero shear of a fluid comprising the network forming material alone;
placing the treatment fluid in a subterranean formation;
contacting the treatment fluid with a hydrocarbon; and
allowing the viscosity of the treatment fluid to decrease to a second viscosity that is lower than the first viscosity.

11. The method of claim 10 wherein the entangled equilibrium polymer network comprises a network forming polymer in an amount of about 0.01% to about 15% by weight of the treatment fluid.

12. The method of claim 10 wherein the entangled equilibrium polymer network comprises at least one surfactant selected from the group consisting of: an anionic surfactant, a neutral surfactant, a cationic surfactant, a catanionic surfactant, a zwitterionic surfactant, and any combination thereof.

13. The method of claim 12 wherein the surfactant is present in the treatment fluid in an amount of from about 0.1% to about 20% by weight of the treatment fluid.

14. The method of claim 10 wherein the treatment fluid further comprises at least one brine.

15. The method of claim 10 wherein the treatment fluid has a yield point value of from about 2 to about 100 and a plastic viscosity value of from about 5 to about 50.

16. The method of claim 10 wherein the entangled equilibrium polymer network maintains structure in a yield stress range up to about 4 Pa.

17. The method of claim 10 wherein the treatment fluid has a plastic viscosity of at least 20 at a temperature of 350° F. and below.

18. A method comprising:
providing a drilling fluid comprising an aqueous base fluid and at least one entangled equilibrium polymer network;
wherein the entangled equilibrium polymer network comprises a viscoelastic surfactant and network forming material;
wherein the network forming material is a hydrophobically modified polymer having a backbone selected from the group consisting of a monomer or polymer that comprises: a vinylpyrrolidone, a vinylpyridine, a polyvinylpyrrolidone, a polyvinylpyridine, a polybutylene succinate, a polybutylene succinate-co-adipate, a polyhydroxybutyrate-valerate, a polyhydroxybutyrate-covalerate, a sulfonated polyethylene terephthalate, a poly($\epsilon$-caprolactone), a poly(phosphazene), any copolymer thereof, any homopolymer thereof, any terpolymer thereof, and any combination thereof;
wherein the viscosity of the treatment fluid at zero shear is higher than the viscosity at zero shear of a fluid comprising the network forming material alone; and,
using the drilling fluid to drill at least a portion of a well bore in a subterranean formation.

* * * * *